(12) United States Patent
Mawhinney et al.

(10) Patent No.: US 10,821,797 B2
(45) Date of Patent: Nov. 3, 2020

(54) WHEEL SENSOR MODULE

(71) Applicant: Continental Automotive, Auburn Hills, MI (US)

(72) Inventors: Nicholas Lee Mawhinney, Linden, MI (US); Steven J. O'Connor, West Bloomfield, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 156 days.

(21) Appl. No.: 16/173,012

(22) Filed: Oct. 29, 2018

(65) Prior Publication Data

US 2020/0130453 A1   Apr. 30, 2020

(51) Int. Cl.
*B60G 17/019* (2006.01)
*B60G 17/0195* (2006.01)
*B60R 16/023* (2006.01)

(52) U.S. Cl.
CPC ..... *B60G 17/01933* (2013.01); *B60G 17/019* (2013.01); *B60G 17/0195* (2013.01); *B60G 17/01908* (2013.01); *B60R 16/0232* (2013.01); *B60G 2204/113* (2013.01); *B60G 2204/115* (2013.01); *B60G 2400/204* (2013.01); *B60G 2400/208* (2013.01); *B60G 2400/252* (2013.01); *B60G 2500/30* (2013.01)

(58) Field of Classification Search
CPC ............ B60G 17/01933; B60G 17/019; B60G 17/0195; B60G 17/01908; B60G 17/0165; B60G 2400/204; B60G 2400/208; B60G 2400/252; B60G 2204/115; B60G 2204/11; B60G 2204/113; B60G 2204/116; B60G 2204/1162; B60G 2500/30; B60G 2800/914; B60G 2800/912; B60G 2800/9122; B60G 2800/9123; B60G 2800/9124; B60R 16/023
USPC ......... 280/5.514, 6.157; 701/37, 38; 180/41; 267/64.16
See application file for complete search history.

(56) References Cited

FOREIGN PATENT DOCUMENTS

JP        2006315442 A    * 11/2006

* cited by examiner

*Primary Examiner* — Keith J Frisby

(57) ABSTRACT

A disclosed vehicle wheel sensor module includes a housing having a mount portion for attachment to a vehicle suspension assembly, a wheel speed sensor supported within the housing, a ride height sensor including a lever movable responsive to movement of a vehicle suspension component and a single connector providing electrical communication with the wheel speed sensor and the ride height sensor.

18 Claims, 1 Drawing Sheet

WHEEL SENSOR MODULE

TECHNICAL FIELD

The present disclosure relates to a sensor module for sensing characteristics of wheel operation including wheel speed, ride height, acceleration and other vehicle operating characteristics utilized for adjusting and modifying vehicle operation.

BACKGROUND

Vehicles include sensors that measure and communicate information regarding operating parameters to a vehicle controller. The controller uses information from the sensors to adjust and modify vehicle operation to match sensed conditions. Information communicated to the controller includes acceleration information, ride height, wheel speed as well as other vehicle operating parameters. Each operating parameter requires a different type of sensor. Each sensor requires a separate signal wire and ground as well as physical mounting structures at multiple locations within the vehicle. Moreover, an electrical connector suitable for the operational environment is needed for each sensor. The quantity of wires required to power and communicate with the sensor complicates manufacture and assembly as well as adding weight and introducing additional points for failure.

Original equipment suppliers and vehicle manufactures are continually seeking to improve operation, reduce costs and maintain consumer satisfaction.

SUMMARY

A vehicle wheel sensor module according to an exemplary embodiment of this disclosure, among other possible things, includes a housing with a mount portion for attachment to a vehicle suspension assembly, a wheel speed sensor supported within the housing, a ride height sensor including a lever movable responsive to movement of a vehicle suspension component and a single connector providing electrical communication with the wheel speed sensor and the ride height sensor.

In a further embodiment of the foregoing wheel sensor module, the housing includes a speed sensor portion supporting the wheel speed sensor proximate the rotating element.

In a further embodiment of any of the foregoing wheel sensor modules, an acceleration sensor is supported within the housing.

In a further embodiment of any of the foregoing wheel sensor modules, the single connector includes a conductor in communication with the acceleration sensor.

In a further embodiment of any of the foregoing wheel sensor modules, the wheel speed sensor is a dual wheel speed sensor.

In a further embodiment of any of the foregoing wheel sensor modules, the single connector provides communication with a vehicle communication bus.

In a further embodiment of any of the foregoing wheel sensor modules, the housing is formed from a plastic material.

In a further embodiment of any of the foregoing wheel sensor modules, the housing is formed from a non-magnetic material.

In a further embodiment of any of the foregoing wheel sensor modules, a printed circuit board is mounted within the housing, and includes portions of the ride height sensor and the wheel speed sensor.

In a further embodiment of any of the foregoing wheel sensor modules, a linkage is attached to the lever, for communicating movement of the vehicle suspension component.

A vehicle sensor system according to another exemplary embodiment of this disclosure, among other possible things, includes, a controller and a wheel sensor module disposed at each wheel of the vehicle and in communication with the controller. The wheel sensor module including a wheel speed sensor supported within a housing, a ride height sensor including a lever movable responsive to movement of a vehicle suspension component with the ride height sensor supported within the housing and a single connector providing electrical communication with the wheel speed sensor and the ride height sensor.

A further embodiment of the foregoing sensor system includes a printed circuit board within the wheel sensor module, the printed circuit board supporting portions of the ride height sensor and the wheel speed sensor.

A further embodiment of any of the foregoing sensor systems includes a wheel speed sensor disposed within the housing and the housing includes a wheel speed sensor portion proximate a rotating wheel element.

A further embodiment of any of the foregoing sensor systems including an acceleration sensor supported within the housing.

In a further embodiment of any of the foregoing sensor systems, the single connector includes a common ground wire and at least one wire for each of the ride height sensor, wheel speed sensor and acceleration sensor.

In a further embodiment of any of the foregoing sensor systems, the single connector provides communication with a vehicle communication bus.

In a further embodiment of any of the foregoing sensor systems, the housing is formed from a non-magnetic material.

A further embodiment of any of the foregoing sensor systems includes a linkage communicating movement of the vehicle suspension component to the lever.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
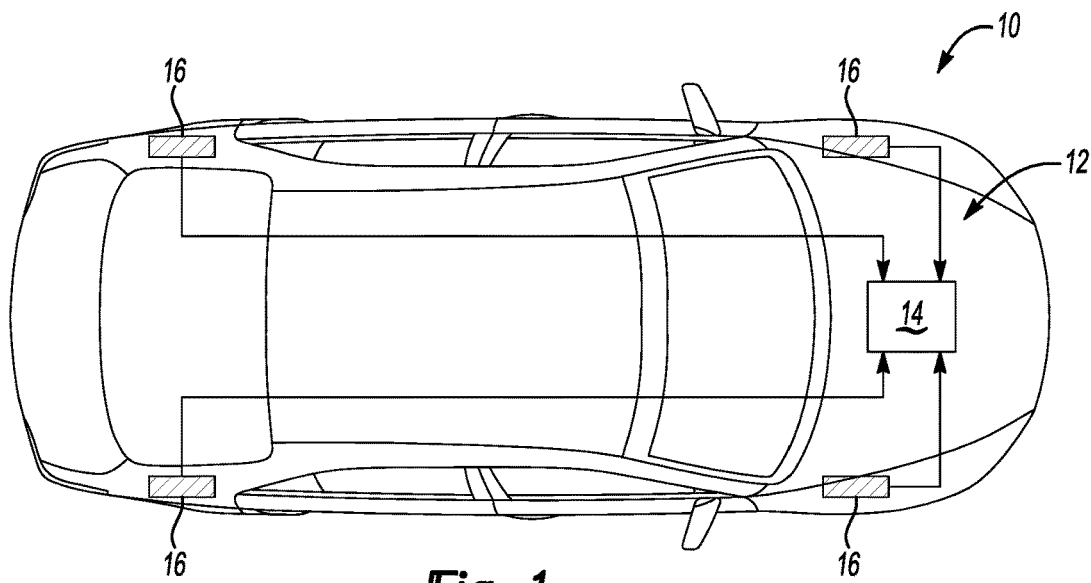
FIG. 1 is a schematic view of a vehicle with an example sensing system embodiment.

Referring to FIG. 1, a vehicle 10 includes a sensor system 12 for sensing vehicle operating parameters. Manufactures are incorporating sensors throughout a motor vehicle to provide information that enables improved vehicle operation. The sensors measure particular vehicle operating characteristics and communicate that information to a vehicle controller 14. The vehicle controller 14 processes the gathered data and makes adjustments to improve vehicle operation. Power and communication of information to each sensor disposed throughout the vehicle requires a wired connection. The amount and complexity of wiring incorporated within a vehicle increases with each additional sensor. The example sensor system 12 includes wheel sensor modules 16 that incorporate several different sensor systems into a single housing with a single connector and common ground. The single connector reduces the number of connections and the number of wires needed for each different sensor. The connector can provide communication to a vehicle communication bus such as a controller area network (CAN) bus as understood by those knowledgeable in the art. Moreover, other communication protocol and methods are within the contemplation of this disclosure to enable communication and powering of sensors supported within the sensor modules 16.

Figure 2:
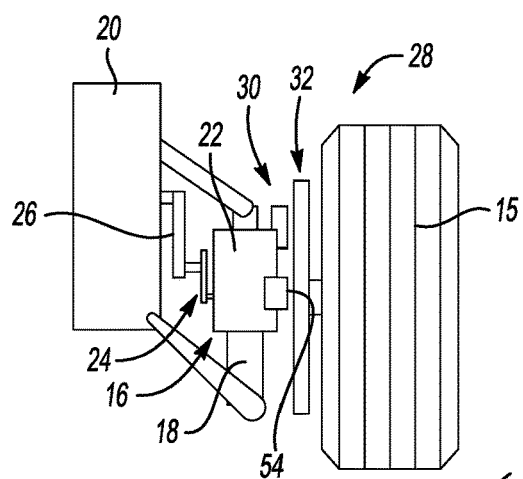
FIG. 2 is a schematic view of an example suspension assembly including an example wheel sensor module embodiment.

Referring to FIG. 2 with continued reference to FIG. 1, the example sensor module 16 is mounted at each suspension assembly 28 corresponding to each wheel of the vehicle 10. The suspension assembly 28 is shown schematically and includes components 18 movable with the wheel 15 supported by a static structure 20. A rotating element 32 rotates with the wheel 15. In the disclosed example, the static structure is a frame member 20.

The sensor module 16 includes a plurality of sensors supported within a common housing 22. The housing 22 includes a mount portion 54 that supports and/or attaches the housing 22 to the suspension assembly 28. In this example, the sensor module 16 is mounted to the moveable component 18. A lever 24 is supported by the housing 22 and rotatable relative to the housing to actuate a ride height sensor. A ride height sensor communicates information to the controller 14 indicative of height of the wheel 15 relative to the frame 20 or other identified parameter. The lever 24 communicates relative movement of the component 18 through a coupling with a linkage 26. The linkage 26 is fixed to the static structure 20.

The housing 22 that supports the lever 24 and several sensors that obtain information relating to operation of the wheel 15 at the specific corner of the suspension assembly 28. In this example, the vehicle includes four wheels 15 and four sensor modules 16 to communicate information at each of the wheels 15.

Figure 3:
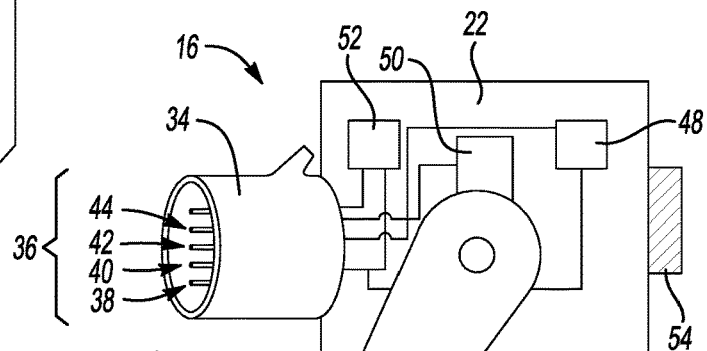
FIG. 3 is a side view of an example wheel sensor module.

Referring to FIG. 3 with continued reference to FIG. 2, the sensor module 16 includes a wheel speed sensor 48, a ride height sensor 50 and an accelerometer 52 that are shown schematically in FIG. 3. The wheel speed sensor 48 is at least partially supported in a wheel speed portion 30. The wheel speed portion 30 is disposed proximate a rotating element 32 to measure and communicate wheel speed to the controller 14. In this example, the wheel speed sensor 48 is a dual wheel speed sensor.

The specific configuration of each of the sensors 48, 50 and 52 are as known in the art. Accordingly, any known sensor type and configuration utilized to provide the desired information is within the contemplation of this disclosure.

Each of the sensors 48, 50 and 52 are disposed within the housing 22 and have a common connector 34. The common connector 34 includes a plurality of leads 36. The leads 36 include a ground lead 38 that is shared with all the sensors 48, 50 and 52 disposed within the housing 22. The connector 34 includes separate leads that provide communication and power for each sensor 48, 50 and 52. A lead 44 is provided in the connector 34 for the wheel speed sensor 48. A lead 42 is provided in the connector 34 for the accelerometer 52. A lead 40 is provided in the connector 34 for the ride height sensor 50. Incorporating all the sensors 48, 50 and 52 into a common housing 22 enables the use of single connector 34 that reduces the number of connection for the entire system 12.

Moreover, in another disclosed example, the connector 34 may provide communication over a CAN bus. The use of CAN bus enables a further reduction in the number or leads required to power and communicate the sensors 48, 50 and 52.

Figure 4:
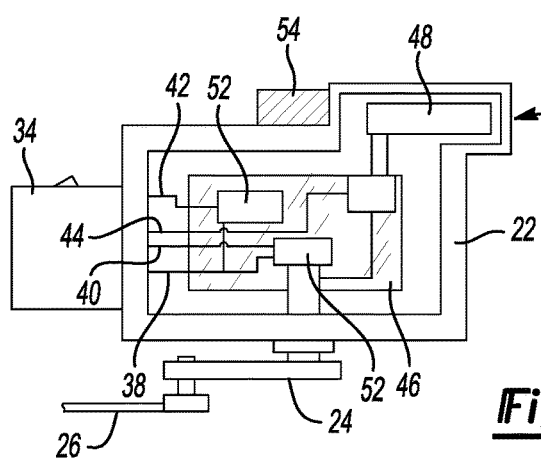
FIG. 4 is a schematic view of the example wheel sensor module.

Referring to FIG. 4 with continued reference to FIGS. 2 and 3, the housing 22 supports a printed circuit board (PCB) 46. The PCB 46 includes portions of each of the sensors 48, 50 and 52 and wiring corresponding with leads in the connector 34. The incorporation of sensors 48, 50 52 that provide different information for different systems into a common housing 22 and PCB 46 reduces the quantity of wiring and connectors. Moreover, the common housing 22 requires only one mounting connection rather than a different mounting connection for each different sensor.

Accordingly, the disclosed sensor module 16 provides a common mounting location for several sensors and also provides a common connection for leads to each of the several sensors.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A vehicle wheel sensor module comprising:
 a housing including a mount portion for attachment to a vehicle suspension component;
 a wheel speed sensor supported within the housing;
 a ride height sensor including a lever movable responsive to movement of a vehicle suspension component, the ride height sensor supported within the housing; and
 a single connector providing electrical communication with the wheel speed sensor and the ride height sensor.

2. The vehicle wheel sensor module as recited in claim 1, wherein the housing includes a speed sensor portion supporting the wheel speed sensor proximate a rotating element.

3. The vehicle wheel sensor module as recited in claim 1, including an acceleration sensor supported within the housing.

4. The vehicle wheel sensor module as recited in claim 3, wherein the single connector includes a conductor in communication with the acceleration sensor.

5. The vehicle wheel sensor module as recited in claim 1, wherein the wheel speed sensor is a dual wheel speed sensor.

6. The vehicle wheel sensor module as recited in claim 1, wherein the single connector provides communication with a vehicle communication bus.

7. The vehicle wheel sensor module as recited in claim 1, wherein the housing is formed from a plastic material.

8. The vehicle wheel sensor module as recited in claim 1, wherein the housing is formed from a non-magnetic material.

9. The vehicle wheel sensor module as recited in claim 1, including a printed circuit board mounted within the housing, wherein the printed circuit board includes portions of the ride height sensor and the wheel speed sensor.

10. The vehicle wheel sensor module as recited in claim 1, including a linkage attached to the lever, the linkage communicating movement of the vehicle suspension component.

11. A vehicle sensor system comprising:
a controller;
a wheel sensor module disposed at each wheel of the vehicle and in communication with the controller, the wheel sensor module comprising a wheel speed sensor supported within a housing, a ride height sensor including a lever movable responsive to movement of a vehicle suspension component, the ride height sensor supported within the housing, and a single connector providing electrical communication with the wheel speed sensor and the ride height sensor.

12. The vehicle sensor system as recited in claim 11, including a printed circuit board within the wheel sensor module, the printed circuit board supporting portions of the ride height sensor and the wheel speed sensor.

13. The vehicle sensor system as recited in claim 11, wherein the wheel speed sensor is disposed within the housing and the housing includes a wheel speed sensor portion proximate a rotating wheel element.

14. The vehicle sensor system as recited in claim 11, including an acceleration sensor supported within the housing.

15. The vehicle sensor system as recited in claim 14, wherein the single connector includes a common ground wire and at least one wire for each of the ride height sensor, wheel speed sensor and acceleration sensor.

16. The vehicle sensor system as recited in claim 11, wherein the single connector is coupled to a communication bus of the vehicle.

17. The vehicle sensor system as recited in claim 11, wherein the housing is formed from a non-magnetic material.

18. The vehicle sensor system as recited in claim 11, including a linkage communicating movement of the vehicle suspension component to the lever.

* * * * *